（12) United States Patent
Erickson

(10) Patent No.: US 9,822,477 B2
(45) Date of Patent: Nov. 21, 2017

(54) BALANCE RING ASSEMBLY

(71) Applicant: WHIRLPOOL CORPORATION, Benton Harbor, MI (US)

(72) Inventor: Donald E. Erickson, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 111 days.

(21) Appl. No.: 14/826,303

(22) Filed: Aug. 14, 2015

(65) Prior Publication Data

US 2017/0044704 A1 Feb. 16, 2017

(51) Int. Cl.
*D06F 37/22* (2006.01)
*D06F 37/24* (2006.01)
*F16F 15/36* (2006.01)

(52) U.S. Cl.
CPC ............ *D06F 37/225* (2013.01); *D06F 37/22* (2013.01); *D06F 37/24* (2013.01); *D06F 37/245* (2013.01); *F16F 15/363* (2013.01)

(58) Field of Classification Search
CPC ........ D06F 37/22; D06F 37/225; D06F 37/24; D06F 37/245; F16F 15/363
See application file for complete search history.

(56) References Cited

U.S. PATENT DOCUMENTS

| | | | | |
|---|---|---|---|---|
| 6,087,951 | A * | 7/2000 | Ramsden | D06F 37/203 200/61.45 M |
| 8,166,984 | B2 * | 5/2012 | Cerruti | A47L 15/4409 134/99.2 |
| 2012/0278996 | A1 * | 11/2012 | Park | D06F 33/02 8/137 |
| 2013/0233028 | A1 * | 9/2013 | Naber | F16F 15/363 68/13 R |
| 2014/0190218 | A1 * | 7/2014 | Jung | F16F 15/167 68/139 |
| 2014/0208806 | A1 | 7/2014 | Ryu et al. | |
| 2014/0208808 | A1 * | 7/2014 | Ryu | D06F 37/225 68/23.2 |
| 2014/0208809 | A1 * | 7/2014 | Kang | D06F 37/225 68/23.2 |
| 2014/0373672 | A1 * | 12/2014 | Kang | D06F 37/225 74/574.1 |

(Continued)

FOREIGN PATENT DOCUMENTS

EP  2441872 A2  4/2012
EP  2826908 A1  1/2015

(Continued)

OTHER PUBLICATIONS

European Search Report for Counterpart EP16182249.9, dated Jan. 18, 2017.

*Primary Examiner* — Joseph L Perrin

(57) ABSTRACT

A balance ring assembly for balancing a liquid holding tub that is rotatable about an axis of rotation in a laundry treating appliance, includes an enclosed annular housing having a hollow annular raceway and a longitudinal axis, a magnetic mass disposed in the hollow annular raceway and movable therein, and a magnet mounted to the annular housing. The balance ring assembly is mounted to a liquid holding tub that is rotatable about an axis of rotation in a laundry treating appliance with the longitudinal axis coincident with the axis of rotation.

19 Claims, 4 Drawing Sheets

(56) References Cited

U.S. PATENT DOCUMENTS

| | | | |
|---|---|---|---|
| 2015/0068255 A1* | 3/2015 | Kim | D06F 37/225 68/23.2 |
| 2015/0315736 A1* | 11/2015 | Fukui | D06F 37/30 68/140 |
| 2016/0258102 A1* | 9/2016 | Kim | D06F 37/225 |

FOREIGN PATENT DOCUMENTS

| | | |
|---|---|---|
| KR | 20080037428 A | 4/2008 |
| KR | 101295361 B1 | 8/2013 |
| WO | 2015050399 A1 | 4/2015 |

* cited by examiner

US 9,822,477 B2

BALANCE RING ASSEMBLY

BACKGROUND OF THE INVENTION

Laundry treating appliances, such as clothes washers, can include a perforate rotatable drum or basket positioned within an imperforate tub to be rotated by a motor. The drum can at least partially define a treating chamber in which a laundry load can be received for treatment according to a selected cycle of operation. The drum can also be rotationally coupled with a balance ring containing a set of masses. During at least one phase of a selected cycle, the motor operably spins the drum and laundry load about a rotational axis at a predetermined high speed, sufficient to centrifugally move and hold laundry load items against the perimeter of the treating chamber, causing liquid to be removed from the laundry load. The speed at which the clothes cease to move with respect to the drum but are held in contact with it can be referred to as the "satellization" speed. During the at least one phase of high speed rotation, the set of masses can traverse the balance ring to generate a counterbalance force to reduce/eliminate an imbalance of the laundry load.

BRIEF SUMMARY OF THE INVENTION

In one aspect, a balance ring assembly for balancing a liquid holding tub that is rotatable about an axis of rotation in a laundry treating appliance includes an enclosed annular housing having a hollow annular raceway and a longitudinal axis, a magnetic mass disposed in the hollow annular raceway and movable therein, and a magnet mounted to the annular housing and movable between a first position wherein the magnet is magnetically coupled with the magnetic mass such that the magnetic mass is not movable in the hollow annular raceway, and a second position wherein the magnet is not magnetically coupled with the magnetic mass such that the magnetic mass is movable in the hollow annular raceway. When the balance ring assembly is mounted to a liquid holding tub that is rotatable about an axis of rotation in a laundry treating appliance with the longitudinal axis coincident with the axis of rotation, the magnet is in the first position when the liquid holding tub rotates at a speed below a predetermined threshold and the magnet is in the second position when the liquid holding tub rotates at a speed above the predetermined threshold In another aspect, a laundry treating appliance includes a drum for receiving a laundry load wherein the drum is rotatable about an axis of rotation, an enclosed annular housing having a hollow annular raceway and a longitudinal axis, a magnetic mass disposed in the hollow annular raceway and movable therein, and a magnet mounted to the annular housing and movable between a first position wherein the magnet is magnetically coupled with the magnetic mass such that the magnetic mass is not movable in the hollow annular raceway, and a second position wherein the magnet is not magnetically coupled with the magnetic mass such that the magnetic mass is movable in the hollow annular raceway. When the balance ring assembly is mounted to the drum with the longitudinal axis coincident with the axis of rotation, the magnet is in the first position when the liquid holding tub rotates at a speed below a predetermined threshold and the magnet is in the second position when the drum rotates at a speed above the predetermined threshold.

DESCRIPTION OF AN EMBODIMENT OF THE INVENTION

Figure 1:
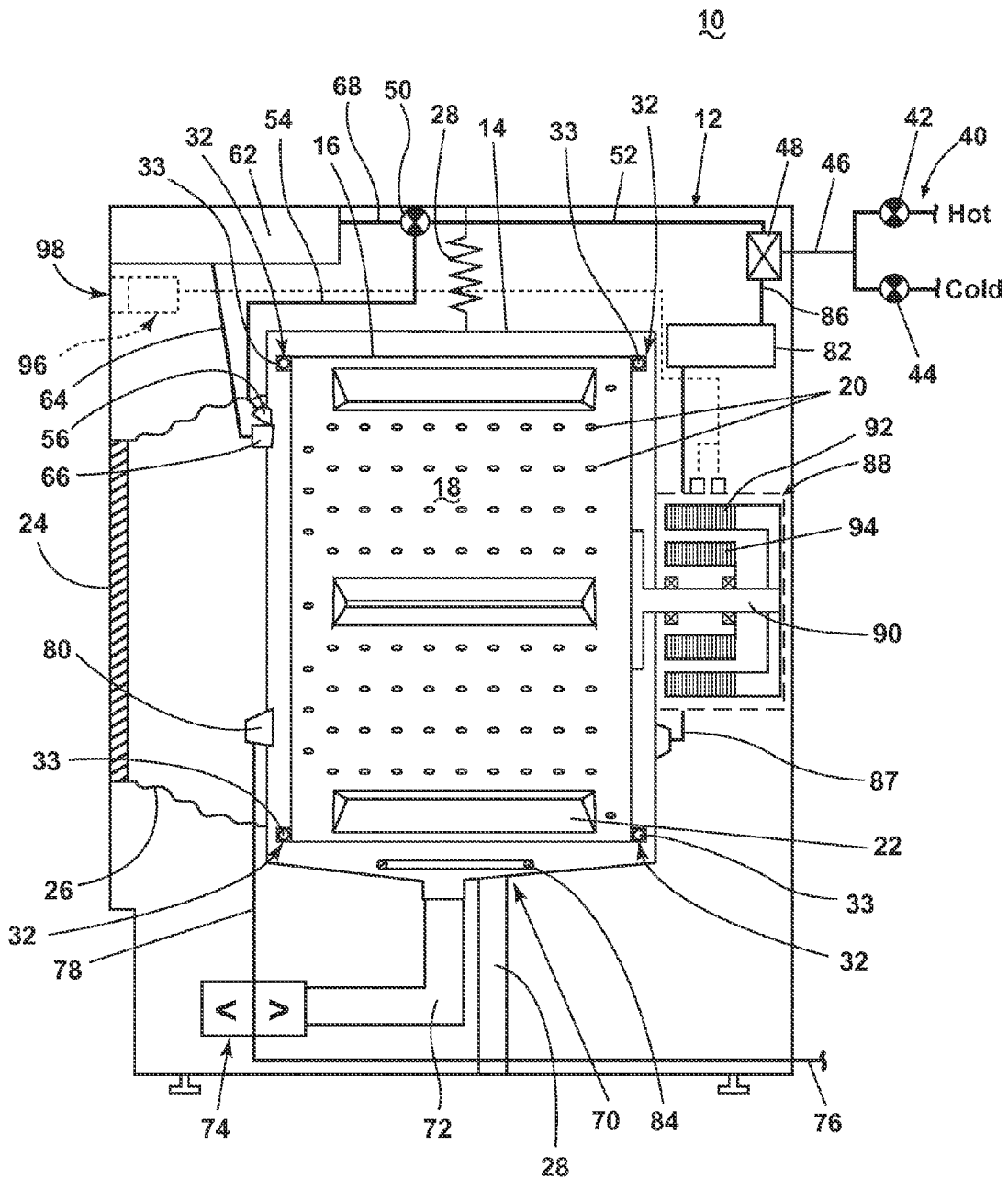
FIG. 1 is a schematic view of a laundry treating appliance in the form of a washing machine according to a first embodiment of the invention.

Referring now to the drawings, FIG. 1 is a schematic view of a laundry treating appliance according to an embodiment of the invention. The laundry treating appliance can be any appliance that performs an automatic or manual cycle of operation to clean or otherwise treat items placed therein, non-limiting examples of which include a horizontal or vertical axis clothes washer; a combination washing machine and dryer; a dispensing dryer; a tumbling or stationary refreshing/revitalizing machine; an extractor; a non-aqueous washing apparatus; and a revitalizing machine.

The laundry treating appliance of FIG. 1 is illustrated as a washing machine 10, which can include a structural support system comprising a cabinet 12 that defines a housing within which a laundry holding system resides. The cabinet 12 can be a housing having a chassis and/or a frame, defining an interior that encloses components typically found in a known washing machine, such as motors, pumps, fluid lines, controls, sensors, transducers, and the like. Such components will not be described further herein except as necessary for a complete understanding of the invention.

The laundry holding system can comprise a tub 14 supported within the cabinet 12 by a suitable suspension system 28 for dynamically suspending the laundry holding system within the structural support system, and a rotatable drum 16 provided within the tub 14 and defining at least a portion of a laundry treating chamber 18. The drum 16 can include a plurality of perforations 20 such that liquid can flow between the tub 14 and the drum 16 through the perforations 20. A plurality of baffles 22 can be disposed on an inner surface of the drum 16 to facilitate lifting of laundry items in the treating chamber 18 as the drum 16 rotates. It is also within the scope of the invention for the laundry holding system to comprise only a tub, with the tub defining the laundry treating chamber.

The laundry holding system can further include a door 24 that can be movably mounted to the cabinet 12 to selectively close both the tub 14 and the drum 16. A bellows 26 can couple an open face of the tub 14 with the cabinet 12, with the door 24 sealing against the bellows 26 when the door 24 closes the tub 14.

The washing machine 10 can also include at least one balance or balancing ring 32 or ring assembly containing a balancing material or mass 33 moveable within the balancing ring 32. The balancing ring 32 can be mounted to the drum 16 or tub 14. The balancing ring 32 can, for example, be utilized to counterbalance one or more rotational imbalances caused by laundry in the treating chamber 18 during rotation of the drum 16. The mass 33 can further include a set of masses 33, and can be in the form of magnetic mass, such as metal balls, fluid or a combination thereof. As used herein, a magnetic mass is a mass that is magnetically attracted to a magnet or magnetic field. The balancing ring 32 can extend circumferentially around a periphery of the drum 16 and can be located at any desired location along an axis of rotation of the drum 16. When multiple balancing rings 32 are present, they can be equally spaced along the axis of rotation of the drum 16.

The washing machine 10 can further include a liquid supply system for supplying water to the washing machine 10 for use in treating laundry during a cycle of operation. The liquid supply system can include a source of water, such as a household water supply 40, which can include separate valves 42 and 44 for controlling the flow of hot and cold water, respectively. Water can be supplied through an inlet conduit 46 directly to the tub 14 by controlling first and second diverter mechanisms 48 and 50, respectively.

The diverter mechanisms 48, 50 can be a diverter valve having two outlets such that the diverter mechanisms 48, 50 can selectively direct a flow of liquid to one or both of two flow paths. Water from the household water supply 40 can flow through the inlet conduit 46 to the first diverter mechanism 48 that can direct the flow of liquid to a supply conduit 52. The second diverter mechanism 50 on the supply conduit 52 can direct the flow of liquid to a tub outlet conduit 54 that can be provided with a spray nozzle 56 configured to spray the flow of liquid into the tub 14. In this manner, water from the household water supply 40 can be supplied directly to the tub 14.

The washing machine 10 can also be provided with a dispensing system for dispensing treating chemistry to the treating chamber 18 for use in treating the laundry according to a cycle of operation. The dispensing system can include a dispenser 62 that can be a single use dispenser, a bulk dispenser or a combination of a single use and bulk dispenser.

Regardless of the type of dispenser used, the dispenser 62 can be configured to dispense a treating chemistry directly to the tub 14 or mixed with water from the liquid supply system through a dispensing outlet conduit 64. The dispensing outlet conduit 64 can include a dispensing nozzle 66 configured to dispense the treating chemistry into the tub 14 in a selected pattern and under a selected pressure. For example, the dispensing nozzle 66 can be configured to dispense a flow or stream of treating chemistry into the tub 14 by gravity, i.e. a non-pressurized stream. Water can be supplied to the dispenser 62 from the supply conduit 52 by directing the diverter mechanism 50 to direct the flow of water to a dispensing supply conduit 68.

Non-limiting examples of treating chemistries that can be dispensed by the dispensing system during a cycle of operation include one or more of the following: water, enzymes, fragrances, stiffness/sizing agents, wrinkle releasers/reducers, softeners, antistatic or electrostatic agents, stain repellants, water repellants, energy reduction/extraction aids, antibacterial agents, medicinal agents, vitamins, moisturizers, shrinkage inhibitors, and color fidelity agents, and combinations thereof.

The washing machine 10 can also include a recirculation and drain system for recirculating liquid within the laundry holding system and draining liquid from the washing machine 10. Liquid supplied to the tub 14 through the tub outlet conduit 54 and/or the dispensing supply conduit 68 can enter a space between the tub 14 and the drum 16 and can flow by gravity to a sump 70 formed in part by a lower portion of the tub 14. The sump 70 can also be formed by a sump conduit 72 that can fluidly couple the lower portion of the tub 14 to a pump 74. The pump 74 can direct liquid to a drain conduit 76, which can drain the liquid from the washing machine 10, or to a recirculation conduit 78, which can terminate at a recirculation inlet 80. The recirculation inlet 80 can direct the liquid from the recirculation conduit 78 into the drum 16. The recirculation inlet 80 can introduce the liquid into the drum 16 in any suitable manner, such as by spraying, dripping, or providing a steady flow of liquid. In this manner, liquid provided to the tub 14, with or without treating chemistry, can be recirculated into the treating chamber 18 for treating the laundry within.

The liquid supply and/or recirculation and drain system can be provided with a heating system that can include one or more devices for heating laundry and/or liquid supplied to the tub 14, such as a steam generator 82 and/or a sump heater 84. The steam generator 82 can be any suitable steam generator, such as a flow-through steam generator or a tank-type steam generator. Liquid from the household water supply 40 can be provided to the steam generator 82 through the inlet conduit 46 by controlling the first diverter mechanism 48 to direct the flow of liquid to a steam supply conduit 86. Steam generated by the steam generator 82 can be supplied to the tub 14 through a steam outlet conduit 87. Alternatively, the sump heater 84 can be used to generate steam in place of or in addition to the steam generator 82. In addition to or instead of generating steam, the steam generator 82 and/or the sump heater 84 can be used to heat the laundry and/or liquid within the tub 14 as part of a cycle of operation.

The liquid supply and recirculation and drain system can differ from the configuration shown in FIG. 1, such as by inclusion of other valves, conduits, treating chemistry dispensers, sensors, such as water level sensors and temperature sensors, and the like, to control the flow of liquid through the washing machine 10 and for the introduction of more than one type of treating chemistry.

The washing machine 10 can also include a drive system for rotating the drum 16 within the tub 14. The drive system can include a motor 88, which can be directly coupled with the drum 16 through a drive shaft 90 to rotate the drum 16 about a rotational axis during a cycle of operation. The motor 88 can be a brushless permanent magnet (BPM) motor having a stator 92 and a rotor 94. Alternately, the motor 88 can be coupled to the drum 16 through a belt and a drive shaft to rotate the drum 16, as is known in the art. Other motors, such as an induction motor or a permanent split capacitor (PSC) motor, can also be used. The motor 88 can rotate the drum 16 at selected speeds in either rotational direction.

The washing machine 10 can also include a control system for controlling the operation of the washing machine 10 to implement one or more cycles of operation. The control system can include a controller 96 located within the cabinet 12 and a user interface 98 that can be operably coupled with the controller 96. The user interface 98 can include one or more knobs, dials, switches, displays, touch screens and the like for communicating with a user, such as receiving input and providing output. The user can enter different types of information including, without limitation, cycle selection and cycle parameters, such as cycle options.

The controller 96 can include a machine controller and any additional controllers for controlling any of the components of the washing machine 10. For example, the controller 96 can include the machine controller and a motor controller. Many known types of controllers can be used for the controller 96. It is contemplated that the controller can be a microprocessor-based controller that implements control software and sends/receives one or more electrical signals to/from each of the various working components to affect the control software. As an example, proportional control (P), proportional integral control (PI), and proportional derivative control (PD), or a combination thereof, a proportional integral derivative control (PID control), can be used to control the various components.

Figure 2:
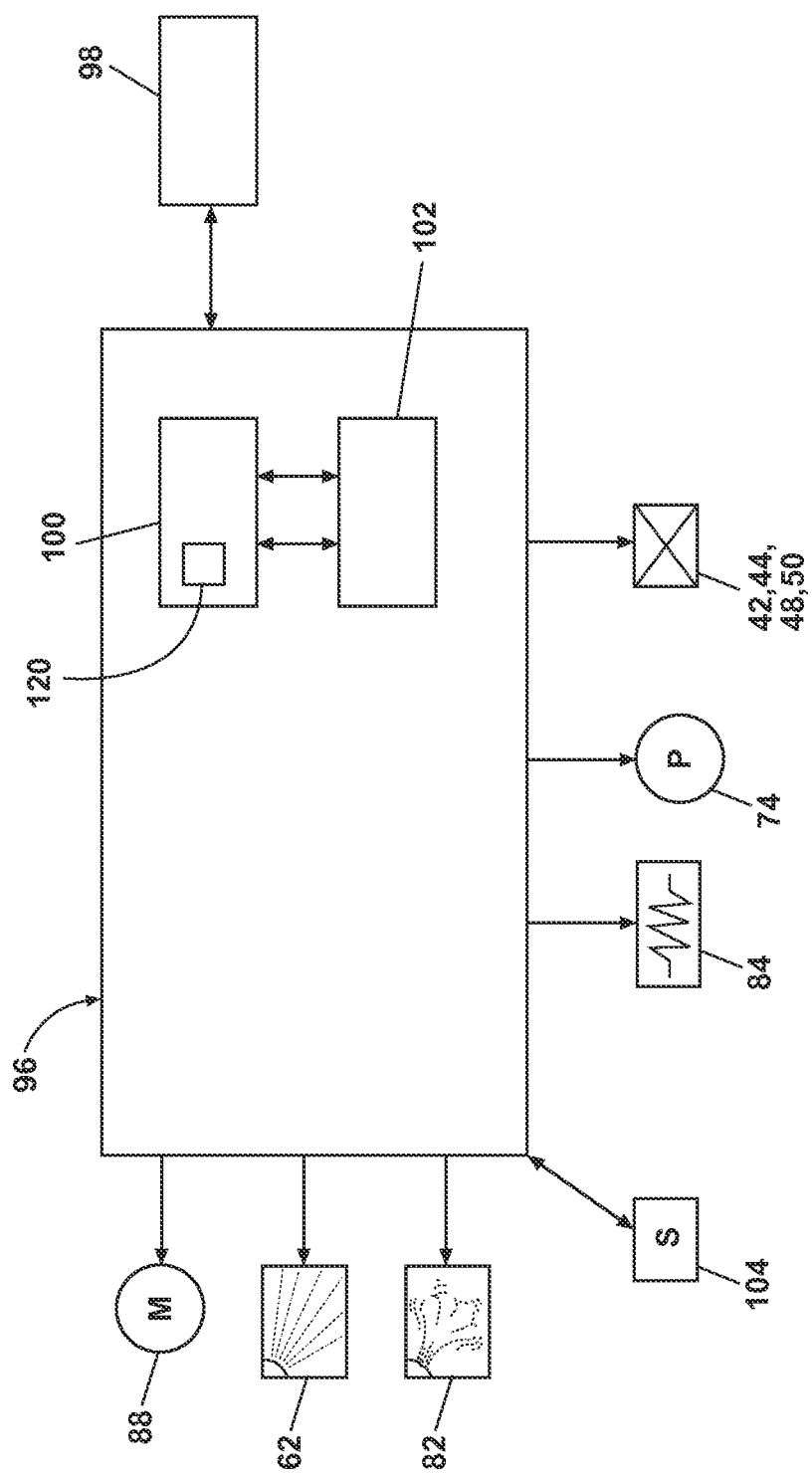
FIG. 2 is a schematic of a control system of the laundry treating appliance of FIG. 1 according to the first embodiment of the invention.

As illustrated in FIG. 2, the controller 96 can be provided with a memory 100 and a central processing unit (CPU) 102. The memory 100 can be used for storing the control software that is executed by the CPU 102 in completing a cycle of operation using the washing machine 10 and any additional software. Examples, without limitation, of cycles of operation can include: wash, heavy duty wash, delicate wash, quick wash, pre-wash, refresh, rinse only, and timed wash. The memory 100 can also be used to store information, such as a database or table, and to store data received from one or more components of the washing machine 10 that can be communicably coupled with the controller 96. The database or table can be used to store the various operating parameters for the one or more cycles of operation, including factory default values for the operating parameters and any adjustments to them by the control system or by user input. For example, a table 120 can include a table of a plurality of spin speed ranges.

The controller 96 can be operably coupled with one or more components of the washing machine 10 for communicating with and controlling the operation of the component to complete a cycle of operation. For example, the controller 96 can be operably coupled with the motor 88, the pump 74, the dispenser 62, the steam generator 82, and the sump heater 84, to control the operation of these and other components to implement one or more of the cycles of operation.

The controller 96 can also be coupled with one or more sensors 104 provided in one or more of the systems of the washing machine 10 to receive input from the sensors, which are known in the art and not shown for simplicity. Non-limiting examples of sensors 104 that can be communicably coupled with the controller 96 include: a treating chamber temperature sensor, a moisture sensor, a weight sensor, a chemical sensor, a position sensor, and/or an imbalance sensor. The controller 96 can also be communicably coupled with one or more motor characteristic sensors 104 capable of generating signals indicative of motor characteristic. These motor characteristic sensors 104 generating motor characteristic signals can include, for example, a motor torque sensor, a motor power sensor, and/or a motor speed sensor, each of which can be used to determine a variety of system and laundry characteristics, such as laundry load inertia or mass. For example, the motor torque sensor can sense or measure the torque characteristics generated by the motor 88 in rotating the drum 16 and generate a motor torque signal reflective of that sensing or measuring. While the motor characteristic sensors 104 are described as "sensing" and/or "measuring" the respective characteristics of the motor 88, it is envisioned that sensing and/or measuring can include the determination of a value indicative or related to the motor characteristics, and not the actual values. For example, it is common for such sensors to output a voltage signal that is proportional to, for example, the motor torque. Thus, the magnitude of the voltage signal is indicative of the torque. In another example, "sensing" and/or "measuring" can include the estimation of a value indicative or related to the motor characteristics, and not the actual values. For example, motor phase currents and voltages can be used indicate or to estimate a characteristic of the motor 88. Additional motor characteristic sensors 104 can be included.

As another example of a motor characteristic sensor 104, a speed sensor, can also be included in the washing machine 10 and can be positioned in any suitable location for detecting and indicating a speed output indicative of a rotational speed of the drum 16. Such a speed sensor can be any suitable speed sensor capable of providing an output indicative of the speed of the drum 16. The rotational speed of the drum 16 can also be determined based on motor speed; thus, a speed sensor can include a motor speed sensor for determining a speed output indicative of the rotational speed of the motor 88. The motor speed sensor can be a separate component, or can be integrated directly into the motor 88. Regardless of the type of speed sensor employed, or the manner of coupling the drum 16 with the motor 88, the speed sensor can be adapted to enable the controller 96 to determine the rotational speed of the drum 16 from the rotational speed of the motor 88.

Conventionally, rotation of the drum can be characterized in terms of either rotational speed or frequency. As an example, 1 rotation per second (speed) can be equivalent to 1 Hz or 1 cycle per second (frequency). Thus, speed and frequency can be interchangeable.

Depending upon the rotational speed of the drum 16, the laundry load can undergo at least one of tumbling, rolling (also called balling), sliding, satellizing (also called plastering), and combinations thereof. Tumbling, rolling, sliding, and satellizing are terms of art that can be used to describe the motion of some or all of the items forming the laundry load. For example, during tumbling, fabric items can be carried from a lowest location in the drum 16 towards a highest location in the drum 16, but can fall back to the lowest location before reaching the highest location. During satellizing, the drum 16 can rotate at a speed such that fabric items are held against the inner surface of the drum 16 and rotate with the drum 16 without falling.

Figure 3:
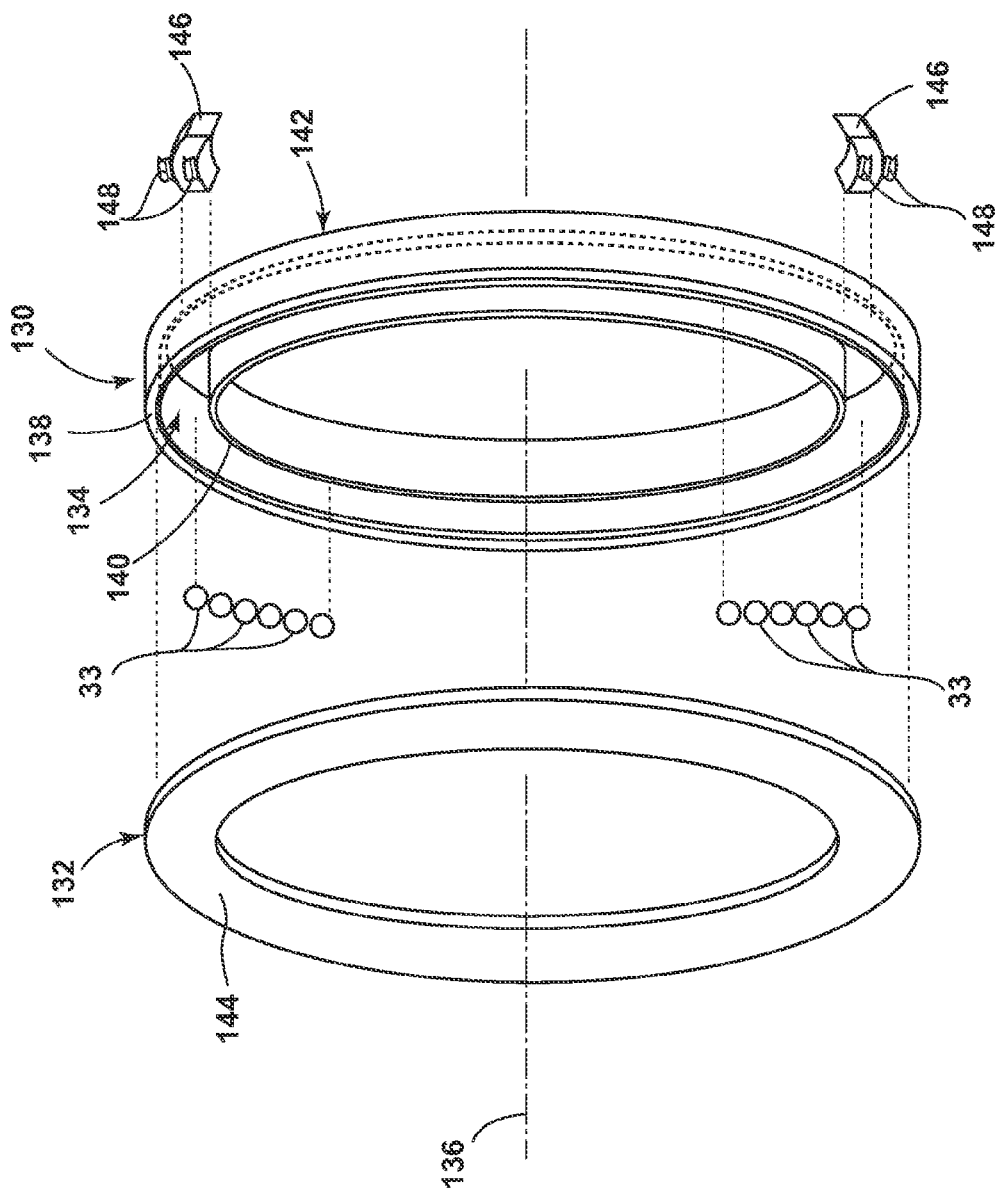
FIG. 3 illustrates an axially exploded balancing ring of the laundry treating appliance.

FIG. 3 illustrates an exemplary balancing ring 32 according to embodiments of the disclosure. As shown, the balancing ring 32 can include a first annular housing 130 or ring and a second annular housing 132, cover, or ring, wherein the first housing 130 and the second annular housing 132 are configured to be assembled to form an enclosed annular balancing ring 32. The first housing 130 can include an outer radial wall 138, an inner radial wall 140, and a rear axial sidewall 142 between the outer and inner radial walls 138, 140, wherein the walls 138, 140, 142 define a radial channel 134 or an annular raceway encircling a longitudinal axis 136, coincident with the axis of rotation of the drum 16 or tub 14. Likewise, the second housing 132 can include a forward axial sidewall 144 configured or sized to extend between the outer and inner radial walls 138, 140 of the first housing 130. The set of masses 33 can be received by or disposed in the radial channel 134 such that the masses 33 are moveable therein, and retained therein by the coupling of the first housing 130 with the second housing 132.

The balancing ring 32 can additionally include a set of magnets 146 mounted to the first housing 130 proximate to the radial channel 134. Each magnet 146 can include, for example, one or more hinges 148 configured to hingedly couple the magnet 146 with the first housing 130. In this sense, the magnet 146 can be moveably or hingedly mounted to the first housing 130, or movable relative to the first housing 130. The set of magnets 146 can be rotationally spaced about the first housing 130 such that the magnets 146 are rotationally balanced with the housing 130.

The set of magnets 146 can be configured, formed, sized, or dimensioned to match the annular shape of the first housing 130. The set of magnets 146 can further be configured, formed, sized, or dimensioned to match a predetermined number of masses 33 disposed in the radial channel 134. For example, the radially balanced set of magnets 146 can be configured such that a magnetic field generated by each magnet 146 can interact with, or where the magnetic field is strong enough, "hold" or retain an equal number of magnetic masses 33 along a portion of the radial channel 134 proximate to each magnet 146. Stated another way, the radially balanced set of magnets 146 can be configured to magnetically attract a correspondingly equal number of magnetic masses 33 such that when the masses 33 are magnetically coupled with the magnets 146, the masses 33 are likewise radially balanced about the balancing ring 32.

While the balancing ring 32 is described having the first housing 130 and the second housing 132, alternative constructions and configurations of the balancing ring 32 can be included, so long as the balancing ring 32 defines an enclosed annular housing having a hollow annular raceway about the longitudinal axis 136, wherein the set of masses 33 are moveable therein. Additionally, while the set of magnets 146 and hinges are shown configured to mount with the rear axial sidewall 142 of the first housing 130, embodiment of the disclosure can include configurations of the magnets 146 and hinges 148 mounted external to the first or second housings 130, 132 or external to the radial channel 134. Thus, embodiments of the disclosure can include mounting of the magnets 146 to the forward axial sidewall 144, outer radial wall 138, or inner radial wall 140.

Figure 4:
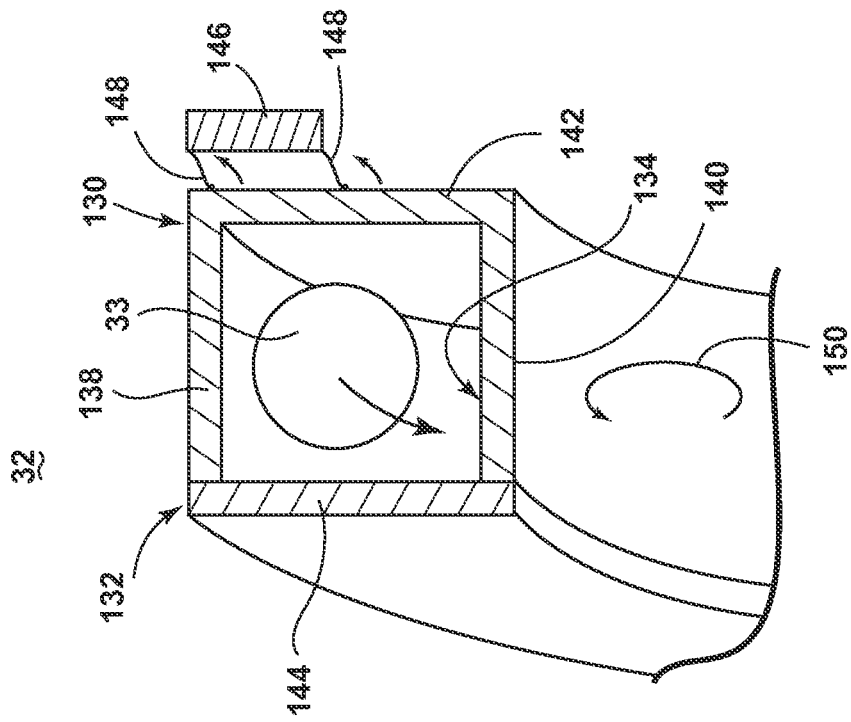
FIG. 4 is a cross-sectional view of the balancing ring of FIG. 3 when the magnet is in the first position.

FIG. 4 illustrates a cross-sectional view of the assembled balancing ring 32 showing the mounting of the magnet 146 relative to the first and second housings 130, 132 in a first position. As shown, the first and second housings 130, 132 are coupled to form the enclosed annular housing retaining the masses 33 in the radial channel 134. The illustration also shows the magnet 146 in the first position relative to the first and second housings 130, 132 or relative to the channel 134. As shown, the magnet 146 can be coupled with the rear axial sidewall 142 by one or more hinges 148 such that the magnet 146 in the first position is substantially parallel with the sidewall 142, or proximate to the channel 134.

The magnet 146 can be selected or configured to generate a magnetic field strong enough to attract, retain, hold, or magnetically couple with at least one magnetic mass 33 proximate to the magnet 146, such as along the rear axial sidewall 142. The magnet 146 can be further selected or configured such that the magnetic field attracts, retains, or holds the at least one magnetic mass 33 proximate to the magnet while the balancing ring 32 is not rotating, or while the balancing ring 32 or drum 16 (not shown) is rotating below a predetermined rotational speed threshold. Stated another way, when the magnet 146 is in the first position, the mass 33 is not movable in the radial channel 134 or annular raceway.

Additionally, at least one hinge 148 can include a spring hinge having a bias configured to bias the magnet 146 or hinge 148 toward the first position. The hinge 148, spring hinge, or bias can be configured to oppose at least a portion of the centripetal force subjected to magnet 146 in response to the magnet 146 being rotated, as described herein. Thus, the hinge 148, or a combination of a set of mounting hinges 148 can be selected or configured such that the bias of the hinge or hinges 148 overcomes the centripetal force applied to the magnet 146 while the magnet 146 is being rotated at a rotational speed below a predetermined rotational speed threshold. One example of the predetermined rotational speed threshold can include rotational speeds between 80 and 90 rotations per minute (RPM). Alternatively, the predetermined threshold can include a single speed (e.g. 80 RPM) or alternative speed ranges. The predetermined threshold can include speeds relative to a satellizing speed or a water removal rotational speed.

Figure 5:
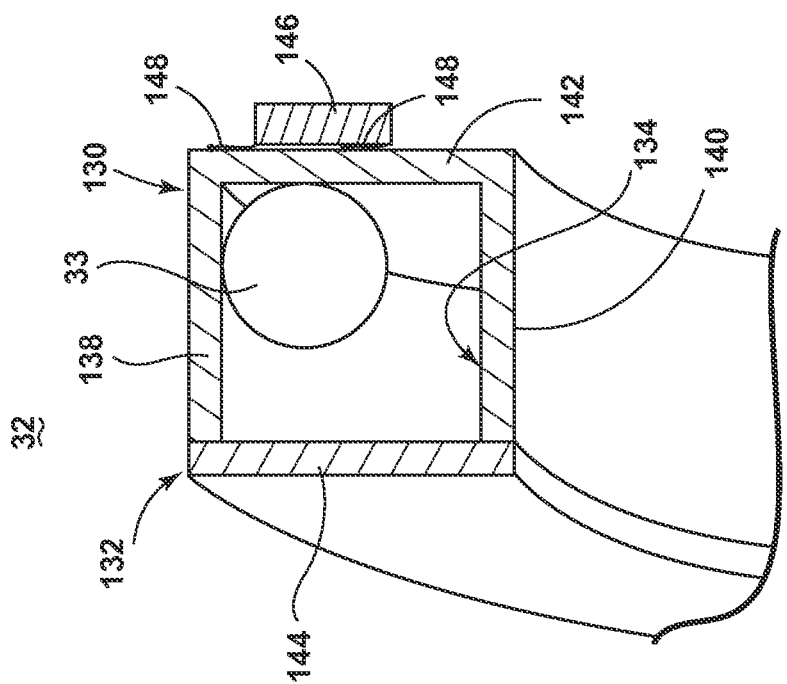
FIG. 5 is a cross-sectional view of the balancing ring of FIG. 3 when the magnet is in the second position.

FIG. 5 illustrates the cross-sectional view of the assembled balancing ring 32 showing the mounting of the magnet 146 relative to the first and second housings 130, 132, radial channel 134, or masses 33 in a second position. As shown, when the magnet 146 is rotated (shown by arrow 150) at a speed greater than the predetermined rotational speed threshold, the one or more hinges 148, spring hinge, or bias is overcome by the centripetal force applied to the magnet 146. Based on the configuration of the hinge 148, the magnet 146 can be drawn away from the radial channel 134 by a distance sufficient to release, separate, or magnetically decouple the magnet 146 from the magnetic mass 33 such that the mass 33 is freely moveable in the radial channel 134. Stated another way, the magnet 146 in the second position is not or no longer magnetically coupled with the mass 33.

In this sense, the embodiments of the disclosure provide for a magnet 146 movable between a first position and a second position such that a magnetic mass 33 is, respectively, magnetically coupled with the magnet 146 while the magnet rotates at a speed below the predetermined threshold, and is not magnetically coupled with the magnet 146 while the magnet rotates at a speed above the predetermined threshold. The magnet 146 is further moveable between the first position and the second position in response to centripetal force applied by the rotation of the drum 16 or tub 14. Stated another way, the magnet 146 is movable between the first position wherein the magnet 146 is in a first radial position relative to the longitudinal axis of rotation 136 and a second position wherein the magnet 146 is in a second radial position relative to the axis 136, such that the second radial position is a greater radial distance from the longitudinal axis of rotation 136 than the first radial position.

Embodiments of the disclosure can include configuring or selecting the hinge 148 to bias against or interact with the centripetal force applied to the magnet 146. For example, the bias can be selected or configured based on the weight of the magnet 146, the predetermined rotational speed threshold selected, and the masses 33. Additional configurations or considerations can be included.

Embodiments of the disclosure can be included wherein alternative mountings operate under the same considerations and principles. For example, a magnet 146 can include only a single hinge 148 positioned near the outer radial wall 138, such that the rotation of the magnet 146 rests in the first position below the predetermined speed threshold and magnetically couples the magnet 146 with the mass 33 along the rear axial sidewall 142. When the rotation of the magnet 146 accelerates above the predetermined speed threshold, the centripetal forces acting on the magnet 146 decouples the magnet 146 from the mass 33 as the magnet 146 rotates or folds about the single hinge 148, away from the axis of rotation toward the second position.

In another alternative mounting, the magnet 146 can be hingedly mounted with the inner radial wall 140, wherein the mounting further includes a counterweight. The counterweight can be heavier than the magnet 146, mounted to pivotally oppose to the magnet 146, and configured to be subjected to centripetal forces. The mounting can also include a bias to bias the magnet toward the first position, that is, toward a position parallel with the inner radial wall 140. When the rotation of the magnet 146 is below the predetermined threshold, the bias of the hinge mounting overcomes the centripetal force on the counterweight such that the magnet 146 is magnetically coupled with the mass 33 and holds the mass 33 along the inner radial wall 140. When the rotation of the magnet 146 is above the predetermined threshold, centripetal forces acting on the heavier counterweight are greater than the combined forces of the centripetal forces acting on the magnet 146 and the bias of the mounting, such that the magnet 146 is drawn away from the inner radial wall 140 to the second position, and the magnet 146 and mass 33 are magnetically decoupled.

In yet another alternative mounting, the magnet 146 can be hingedly mounted with the outer radial wall 138 such that the mounting includes a bias configured to bias the magnet 146 against the outer radial wall 138 into the first position. This alternative mounting can be configured such that mounting or bias overcomes the centripetal force on the magnet 146 while the magnet 146 is rotated at a speed below the predetermined threshold and wherein the mounting or bias is overcome by the centripetal force on the magnet 146 when the magnet 146 is rotated at a speed above the predetermined threshold.

If a sufficiently large enough load imbalance is present, the washing machine can experience undesirable vibrations and movements when the drum 16 is rotated at high speeds during a spin phase. To address the imbalance, additional elements or systems, such as the balance rings 32, are incorporated into the washing machine to absorb, dampen, or offset the vibrations and movements.

The movement of the masses 33 within the balancing ring 32 is a function of the amount of the load imbalance and the rotation speed of the drum 16. The masses 33 in the balancing rings 32 moves relative to the load imbalance such that the load imbalance can be counterbalanced by the masses 33. However, the masses 33 can move independent of the load imbalance and/or respond more slowly than the rotational speed of the drum such that the net imbalance of the system changes over time. In one example, a balancing ring 32 having metal balls for the masses 33 can rotate three percent slower than the drum 16.

Many other possible embodiments and configurations in addition to that shown in the above figures are contemplated by the present disclosure. For example, one embodiment of the invention contemplates an apparatus and method applied to a vertical axis washing machine having a balancing ring 32. Additionally, the design and placement of the various components can be rearranged such that a number of different in-line configurations could be realized.

The embodiments disclosed herein provide balance ring assembly for a laundry treating appliance wherein a magnet retains the balance ring masses in place until the rotational speed of the drum reaches or exceeds a predetermined speed threshold. One advantage that can be realized in the above embodiments is that the above described embodiments automatically provide for release or movement of the masses in response to the drum reaching or exceeding a predetermined rotational speed threshold, and automatically catches or holds the masses when the rotational speed of the drum is below the predetermined threshold. This configuration eliminates audible noise of the masses traversing the radial channel during lower speeds, while allowing them to provide counterbalancing forces, as explained, when needed. Additionally, embodiments of the disclosure can be configured to select a predetermined threshold to provide for the catching and releasing as needed. Yet another benefit of embodiments of the disclosure is that the controller or control system of the laundry treating appliance can determine a more precise calculation or reading of the laundry imbalance in the absence of the masses moving within the radial channel (e.g. while they are held by the magnet in the first position), leading to a more accurate laundering cycle of operation.

To the extent not already described, the different features and structures of the various embodiments can be used in combination with each other as desired. That one feature is not illustrated in all of the embodiments is not meant to be suggest that it cannot be. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A laundry treating appliance comprising:
    a drum for receiving a laundry load wherein the drum is rotatable about an axis of rotation;
    an enclosed annular housing mounted to the drum having a hollow annular raceway;
    a magnetic mass disposed in the hollow annular raceway and movable therein; and
    a magnet mounted to the annular housing by at least one mounting and movable by way of the at least one mounting during a cycle of operation between a first position wherein the magnet is magnetically coupled with the magnetic mass such that the magnetic mass is not movable in the hollow annular raceway, and a second position wherein the magnet is not magnetically coupled with the magnetic mass such that the magnetic mass is movable in the hollow annular raceway;
    wherein the magnet is in the first position when the drum rotates at a speed below a predetermined threshold and the magnet is in the second position when the drum rotates at a speed above the predetermined threshold.

2. The laundry treating appliance of claim 1 wherein the annular housing includes an outer radial wall, an inner radial wall, and opposing axial sidewalls between the inner radial wall and the outer radial wall.

3. The laundry treating appliance of claim 2 wherein the magnet is mounted to at least one of the opposing axial sidewalls.

4. The laundry treating appliance of claim 3 wherein the at least one mounting is a hinge mounting mounted with the annular housing.

5. The laundry treating appliance of claim 4 wherein the hinge mounting is a spring hinge having a bias configured to bias the magnet toward the first position.

6. The laundry treating appliance of claim 5 wherein the magnet is movable between the first position and the second position in response to centripetal force.

7. The laundry treating appliance of claim 6 wherein the bias of the spring hinge overcomes the centripetal force while the magnet is rotated at a speed below the predetermined threshold and wherein the bias of the spring hinge is overcome by the centripetal force while the magnet is rotated at a speed above the predetermined threshold.

8. The laundry treating appliance of claim 2 wherein the at least one mounting is a hinge mounting mounted to the inner radial wall and having a bias configured to bias the magnet toward the first position.

9. The laundry treating appliance of claim 8 further including a counterweight mounted with the magnet, and configured such that the counterweight is subjected to centripetal force.

10. The laundry treating appliance of claim 9 wherein the bias of the hinge mounting overcomes the centripetal force on the counterweight while the magnet is rotated at a speed below the predetermined threshold and wherein the bias of the hinge mounting is overcome by the centripetal force on the counterweight while the magnet is rotated at a speed above the predetermined threshold.

11. The laundry treating appliance of claim 2 wherein the at least one mounting is a hinge mounting mounted to the outer radial wall and having a bias configured to bias the magnet toward the first position.

12. The laundry treating appliance of claim 11 wherein the bias of the hinge mounting overcomes the centripetal force on the magnet while the magnet is rotated at a speed below the predetermined threshold and wherein the bias of the hinge mounting is overcome by the centripetal force on the magnet while the magnet is rotated at a speed above the predetermined threshold.

13. The laundry treating appliance of claim 1 wherein a set of magnets are radially mounted to the annular housing such that the annular housing is rotationally balanced.

14. The laundry treating appliance of claim 13 wherein the magnetic mass includes a set of magnetic masses, and the set of magnets are configured such that the set of magnetic masses are rotationally balanced when magnetically coupled with the set of magnets.

15. The laundry treating appliance of claim 1 wherein the magnet further includes movement between the first position wherein the magnet is in a first radial position relative to the axis of rotation, and the second position wherein the magnet is in a second radial position relative to the axis of rotation, wherein the second radial position is a greater radial distance from the axis of rotation than the first radial position.

16. The laundry treating appliance of claim 1 wherein the predetermined threshold is between 80 and 90 rotations per minute.

17. The laundry treating appliance of claim 1 wherein the at least one mounting is adapted such that the magnet is movable between the first position and the second position in response to centripetal force on the magnet.

18. A balance ring assembly for balancing a liquid holding tub that is rotatable about an axis of rotation in a laundry treating appliance, the balance ring assembly comprising:
an enclosed annular housing having a hollow annular raceway and a longitudinal axis;
a magnetic mass disposed in the hollow annular raceway and movable therein; and
a magnet mounted to the annular housing by at least one mounting and movable by way of the at least one mounting during a cycle of operation between a first position wherein the magnet is magnetically coupled with the magnetic mass such that the magnetic mass is not movable in the hollow annular raceway, and a second position wherein the magnet is not magnetically coupled with the magnetic mass such that the magnetic mass is movable in the hollow annular raceway;
wherein when the balance ring assembly is mounted to a liquid holding tub that is rotatable about an axis of rotation in a laundry treating appliance, the magnet is in the first position when the liquid holding tub rotates at a speed below a predetermined threshold and the magnet is in the second position when the liquid holding tub rotates at a speed above the predetermined threshold.

19. A laundry treating appliance comprising:
a drum for receiving a laundry load wherein the drum is rotatable about an axis of rotation;
an enclosed annular housing mounted to the drum having a hollow annular raceway;
a magnetic mass disposed in the hollow annular raceway and movable therein; and
a magnet mounted to the annular housing by at least one hinge mounting and movable by way of the at least one hinge mounting between a first position wherein the magnet is magnetically coupled with the magnetic mass such that the magnetic mass is not movable in the hollow annular raceway, and a second position wherein the magnet is not magnetically coupled with the magnetic mass such that the magnetic mass is movable in the hollow annular raceway;
wherein the magnet is in the first position when the drum rotates at a speed below a predetermined threshold and the magnet is in the second position when the drum rotates at a speed above the predetermined threshold.

* * * * *